Nov. 14, 1933.  J. E. SHEPHERD  1,934,826
METHOD FOR TREATING FOOD CARRYING VEHICLES
Filed April 4, 1928  2 Sheets-Sheet 1
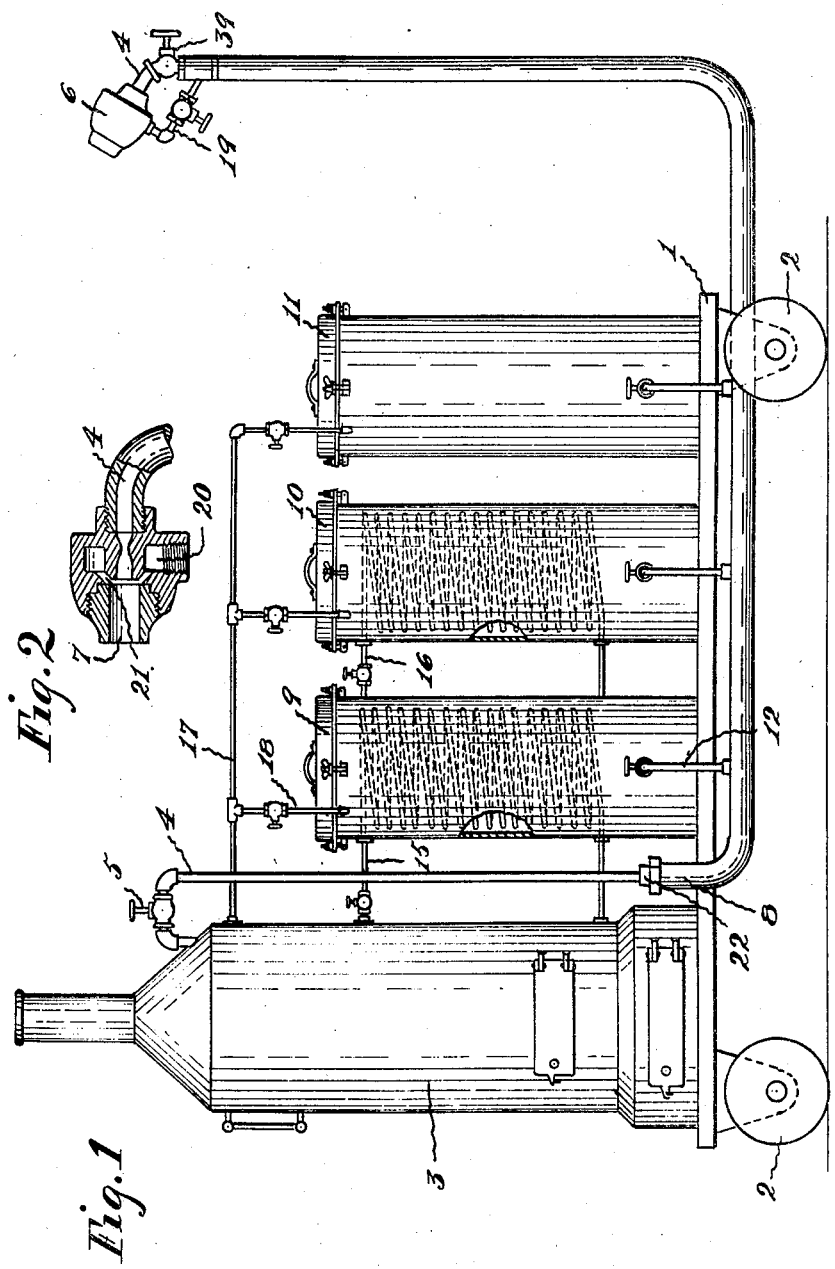
INVENTOR
John E. Shepherd,
BY
Harold D. Penney
ATTORNEY Nov. 14, 1933.   J. E. SHEPHERD   1,934,826
METHOD FOR TREATING FOOD CARRYING VEHICLES
Filed April 4, 1928   2 Sheets-Sheet 2

INVENTOR
John E. Shepherd,
BY
Harold D. Penny ATTORNEY

Patented Nov. 14, 1933                                            1,934,826

UNITED STATES PATENT OFFICE 1,934,826

METHOD FOR TREATING FOOD-CARRYING VEHICLES

John Eldon Shepherd, Charlottesville, Va., assignor to National Cold Steam Company, Charlottesville, Va., a corporation of Delaware Application April 4, 1928. Serial No. 267,204

8 Claims. (Cl. 167—3)

My present invention relates to apparatus for, and method of, cleaning, sterilizing and preserving vehicles and more especially to freight cars generally, and to refrigerator freight cars. Continued dampness of cars of this type furnishes conditions encouraging the harboring of a variety of destructive bacteria and fungi. These bacteria and fungi feed on the moist wood fiber and cause rotting of the wood. Lack of moisture diminishes this condition, thus saving the wooden structures, and hence any expediency which removes moisture and preserves the wood against moisture permeation, diminishes the rapidity of decay of wood and lengthens its useful life.

Even seasoned wood is limited in its resistive powers, for after a time the wood absorbs moisture and then furnishes conditions fostering the growth of bacteria and fungi.

Heretofore the problem, of preserving wooden refrigerator or non-refrigerator railway vehicles engaged in transporting vegetable and animal matter, against the inroads of bacterial and fungi decomposition, rot and the like, has been an expensive and vexatious task.

Freight cars, such as abattoir and fruit cars often have to carry meats, cattle, fish, fowl, fruits, vegetables and other like cargoes long distances. In the case of vegetables, fruits, dressed meats, fish and fowl and foodstuffs of a perishable nature, the carrier vehicle must be lined with ice to preserve them against decomposition, especially when such cargoes are transported long distances.

Obviously when refrigerator cars are discharged of their loads, refuse of animal and vegetable matters is left in the cars. Thereafter, the remaining ice either freezes as a mass in the bunkers or on the floor of the emptied car with the debris embedded therein, making it difficult to clean, or the ice melts and mixes with the refuse, forming a slime which is an ideal nutritive medium for the decomposition, bacteria and fungi. The walls and floor of the car are covered with the moisture from the melting ice and the wet refuse. If the cars are sent back empty for further perishable freight, they are carelessly cleaned and, in most instances, re-iced, to prevent or retard, to a certain extent, the decomposition and putrefaction of the slimes on the walls and floor of the cars.

This procedure is expensive and experience has shown that the walls and sills and floor of the car rot fast, in spite of the re-icing. As explained above, decomposition and putrefactive bacteria and fungi thrive on wood that is moist. Add vegetable and animal slimes thereto and the walls and floors of the cars will not last long, in spite of the re-icing for continued cold temperatures.

I have discovered a method of cleaning, a food-carrying vehicle, easily and economically, and preserving the wood against deterioration. I not only quickly and readily remove the residual ice from an unloaded refrigerator car, but I clean, dry, sterilize and preserve the wooden structure easily and economically by substances which preserve the wood and render it moisture-proof, which substances are deleterious to bacteria and fungi.

Further, in the preservation of the wood after cleansing and drying, I have found that by my method and apparatus, the vaporized materials utilized in the treatment of the wood for preservation and fungicidal treatment are caused to penetrate into and then condense within the wood a considerable depth due to the application of the hot steam or hot fluid gases and its embodied treating materials in hot vapor form and the velocity of the materials driven into the surface thereby. This is an extremely important feature.

Accordingly, one of the main objects of my invention is to provide a method of cleaning, sterilizing and preserving, in sterilized condition, wooden freight and refrigerator cars used to transport perishable vegetable and animal food products subject to rotting engendered by decay-causing bacteria and fungi, this increasing the useful life of such vehicle and reducing reconstruction costs.

A very important object is the method I use in clearing out empty refrigerator cars. In cold weather the residual ice left from a load lodges on the floor of the car and becomes compacted and frozen thereto. My apparatus not only melts this ice, but sweeps out the melt and its contained debris. In actual practice in freezing weather I have cleaned an entire car in a little over a half an hour, leaving the car clean and sweet, ready for a re-load.

Another object of the invention is to provide a method of, and apparatus for, simultaneously cleaning and sterilizing the interior of the vehicle adapted to carry perishable food or other materials, after the load has been removed, by subjecting the said interior to a stream of steam, thus destroying germ and fungus encouraging conditions, thereby retarding the decay due to bacteria and fungi. Such treatment further destroys all insects, insect larvæ and similar undesirable life appurtenant to a vegetable cargo, and provides a clean car for re-use for food products.

Another object of the invention is to provide a method for treating freight vehicles subjected to decaying materials, moisture and decay-causing organisms which comprises the steam cleaning of such vehicles so subjected and then coating said portions with waterproofing materials thereby retarding the effect of such deleterious factors.

Another object is to treat, by the same method and apparatus, the exterior of such cars to coat the outside thereof with a waterproof coating, thereby to enable the exterior of such vehicle to repel moisture and prevent such moisture from entering the wooden structure from the exterior, and to preserve the protective paint-coating thereon from too rapid deterioration.

Still another object of the invention is to provide an apparatus to accomplish the aforedescribed objects and to have means associated therewith, whereby steam under pressure, disinfectant, preservative waterproofing and weatherproofing material may be selectively ejected therefrom independently or jointly by the operator.

And still another object of the invention is to provide a vehicle adapted to transport perishables that must be kept iced, with a waterproof and preservative coating on the interior of the vehicle, and a weatherproof coating on the exterior of the vehicle thereby in the case of wooden vehicles of such nature reducing the decaying of the wood due to the assimilation of the wooden cells by decay-causing bacteria and fungi in the presence of moisture.

With the above indicated objects in view, one embodiment of the structural features utilized for bringing about the stated results is herein clearly described and fully illustrated in the accompanying drawings in which:

Fig. 1 illustrates an elevation of the apparatus used to accomplish my method.

Fig. 2 illustrates the discharge spray nozzle in section.

Figure 3:
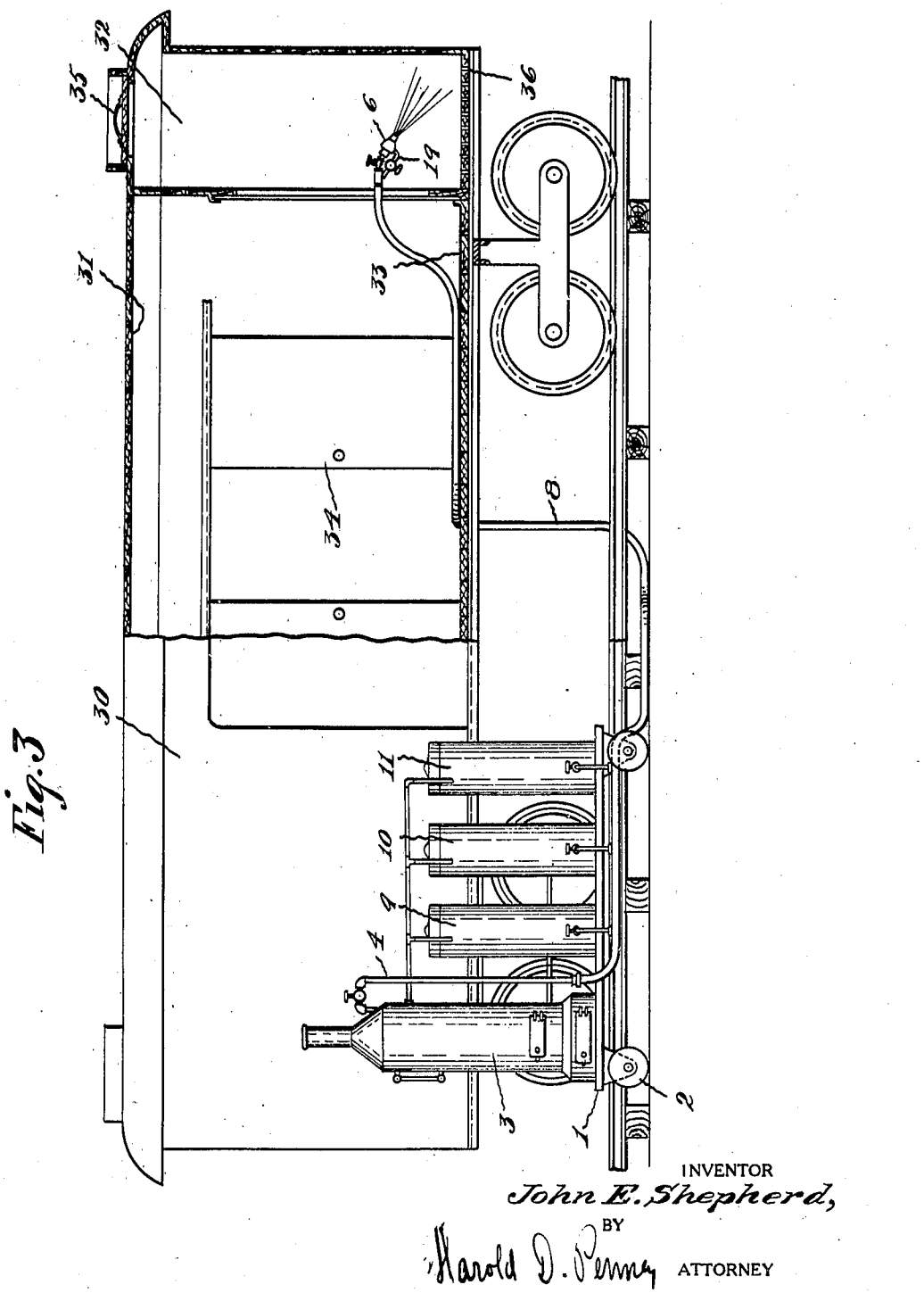
Fig. 3 illustrates the mode of using the apparatus in the interior of a freight car.

Referring more specifically to the drawings, a base 1 carried on wheels 2 supports thereon a conventional vertical steam boiler. This wheeled arrangement insures portability and ease of transportation of the apparatus from car to car during use.

A steam line 4, valved as at 5, leads from the boiler to a steam directing nozzle 6. The steam is generated, preferably, at 150 pounds pressure, thereby securing an approximate temperature of 358 degrees F. Obviously, other pressures and temperatures may be used. The nozzle 6 has an adjustable outlet member 7 threadedly disposed therein.

Spaced from and enclosing the steam line 4 there is arranged a line 8 adapted to carry disinfectant and preserving materials. The lines 4 and 8 are made of suitable flexible hose material from the point 22 to the nozzle 6 so that the hose as described has an inner tube 4 for steam and an outer tube 8 concentric with the inner one for the waterproofing, weatherproofing disinfectant or the preserving material. Thus, material flowing through the tube 8 is maintained in hot condition by the steam flowing through the inner tube.

Three tanks 9, 10 and 11 are mounted on the base 1. Tank 9 contains asphalt or other bituminous materials which have waterproofing, as well as preservative, action. Some of such suitable materials are pitch, tar and creosote. A valved steam coil 15 leading from the boiler 3 and disposed in tank 9 maintains the contents thereof hot and in liquid condition for application.

Tank 10 contains a waterproofing and weatherproofing material such as paraffin or like waxy material that is readily taken up by the wood and sheds moisture with facility. A valved steam coil 16 leads from boiler 3, passes through tank 10 and maintains the contents thereof in a hot and liquid state for application.

The tank 11 may carry a disinfectant or sterilizing agent or a suitable wood preserving material, such as may be, preferably, in a normally liquid state. Materials such as creosote and boric acid are useful in this respect. Zinc chloride which is poisonous to timber-destroying bacteria, can also be used to advantage. Since these materials are only gradually dissolved out of the timber of the car by water, they will remain therein for long periods of time. Thus, from time to time, after the car is cleaned after unloading, if found necessary, retreatment in this respect may be performed as herein described.

A steam line 17 leads from the boiler 3 and has three valved branches 18 tapped therefrom and leading into each one of the tanks 9, 10 and 11, the purpose of these branches being to apply discharge pressure to the contents of the tanks and in some instances also to agitate the materials.

Each tank is tapped at its bottom by a valved outlet line as at 12, leading to the outer tube 8. A valved by-pass 19 taps the line 8 near the nozzle 6 and guides the materials flowing through line 8 into the discharge chamber 20 of the nozzle. The steam flowing from line 4 into the discharge member 7 past the conical space 21 draws the material from chamber 20 by eduction. The steam stream and materials are ejected from the nozzle 6 in an intimately mixed atomized jet at high velocity and temperature.

Fig. 3 shows one form of a conventional refrigerator car on a track, with the described apparatus in operative relation thereto. The doors 34 of the car are opened and the hose brought into the car, as shown.

Refrigerator cars of the type shown herein are used generally for transporting perishables long distances. These cars are generally provided with ice chambers 32 on either end of the car. The ice is inserted into each chamber through a closable manhole 35 on the top of the car.

When a freight car is loaded with perishables, such as dressed meats, fowl, fish or fruits and the like, both chambers 32 are filled with ice. Apertures 36 are provided in the chambers for drainage, but the chambers being filled, much of the moisture passes into the freight carrying portion of the car. After the car has arrived at its destination and the contents removed, the chambers 32 are refilled with ice to full capacity and the cars sent back empty to the stockyards or fruit sections for another shipment.

The cold of these chambers is relied on to effectively check decomposition and to control other undesirable developments. This past practice has not proved either satisfactory or economical. The residues from slaughtered animals, fungi, insects and their larvæ left from all vegetable loads all in the presence of the moisture from the melting ice constitute an admirable source of decomposition and putrefaction. After a few such trips the floors and walls begin to exhibit signs of rotting and are never in suitable sanitary condition for foodstuff transportation.

On the other hand my method of treating cars of this nature with the use of the apparatus disclosed is far more sanitary, rapid and economical. When a car is unloaded, the operator gets into the interior of the car with the hose and nozzle 6. All the valves on the branches 12 are closed. The steam valve 5 is open and delivers steam to line 4. The valve on by-pass 19 is closed. A valve 39 on the line 4 controls the flow of the high temperature and velocity steam stream from nozzle 6. Thus, with valve 39 open, the operator plays the jet of steam only, over the entire interior of the car and with proper manipulation the undesired residual contents of the car are swept out and removed.

The ice, left in the chambers 32 and the body proper of the car, is quickly melted by the use of the steam directed into these chambers. The car is swept clean due to the pressure of the steam at 150 pounds. The entire car interior is also initially sterilized since the steam issues from the nozzle at a temperature of about 358° F.

The valve, as at 12, of tank 11 may then be opened and disinfecting or sterilizing material educed from the nozzle 6 by opening the valve of the by-pass 19. The boric acid or zinc chloride or equivalent is thoroughly sprayed over the entire interior thus insuring a complete and thorough impregnation and treatment of the wooden interior of the car with the concomitant destruction of all wood-decaying organisms.

The car is now allowed to dry by leaving the doors 34 open to atmosphere. It is found that complete drying is accomplished in about twenty four to forty eight hours. Since the interior of the car has been thoroughly cleaned and disinfected, the car has been found to dry before any further bacteria or fungi have a chance to develop.

After drying, the entire floor 33 of the car may then be coated and impregnated with a stream of the contents from tank 9, if this is desired. Either asphalt alone or a mixture of asphalt, tar or pitch with creosote may be used. The material quickly sets and forms an exceedingly effective, intimate treatment for waterproofing and preserving the floor and the chambers 32. The pressure of the steam and the finely atomized delivery from the nozzle forces the asphalt into the inner fibres of the wood and hence is not easily attacked by the action of water. Further, once applied, it need not be applied again for a long time.

The valve for tank 9 is then closed, and the valve of tank 10 opened. A stream of waxy material mixed with steam is thus ejected from the nozzle 6. This stream is applied over the interior walls and ceiling 31 of the car.

Further, the wooden exterior of the car is also coated with the dynamic stream of atomized paraffin. In this way a waterproof coating is provided on the interior of the car and a weather-proof coating on the exterior thereof. Water sheds easily from this coating and its advantage is obvious.

The car is now ready for its return trip for a new shipment. No ice need be placed in the chambers 32 until the car arrives at the loading destination. When the car returns with a new load, the asphalt and paraffin coatings preserve the wood. The walls are kept protected from moisture. When the treated car has unloaded, it may be recleaned and, if necessary, the sterilizing and proofing operations repeated.

Of course, my method is not restricted to railroad cars. It may be used on automobile vehicles of such a nature, as also on sea freighters. In fact, it is useful for any type of vehicle transporting perishables kept on ice.

It is also obvious that if the cars made of material other than wood are used, as steel, the procedure herein can be advantageously used, since moisture, bacteria and fungi affect steel and iron surfaces corrosively.

Again, it should be understood that I can eject the materials described herein jointly as well as severally. The paraffin and boric acid or zinc chloride may be ejected at the same time or the contents of the three tanks simultaneously.

It will thus be seen that I have provided an apparatus for, and method of, checking and eliminating the decay of wooden cars carrying perishable materials that are kept iced during transit, by simultaneously cleaning and sterilizing the interior of such cars with steam, after unloading, disinfecting the interior and finally coating the floor and walls of the car with waterproofing and preservative materials, thus dispensing with the need for sending such cars back for reloading in a bacteria and fungi-ridden state, and in addition eliminating the usual re-icing of such empty cars on a return trip, thereby not only rendering a return trip economical, but reducing the depreciation of such cars due to delay of the car material.

While I have described the preferred embodiment of my invention and have given specific examples thereof, it is to be understood that the invention is not to be limited to such preferred embodiments, but may be otherwise embodied within the scope of the following claims.

I claim:

1. A method of cleaning, sterilizing and disinfecting wooden containers containing thick masses of frozen, putrefiable matter, said method comprising subjecting said matter and the adjacent parts of the container to the heat and force of a high pressure dynamic blast of steam of about 150 pounds pressure and about 358 degrees F., thereby simultaneously melting, softening, and detaching said matter, sweeping and transporting said matter to the exterior of the container, cleaning, highly heating, penetrating the subsurface of, and sterilizing said wooden parts and heating said parts to aid in subsequent drying.

2. A method of cleaning, sterilizing and disinfecting containers containing thick masses of frozen, putrefiable matter, said method comprising subjecting said matter and the adjacent parts of the container to the heat and force of a high pressure dynamic blast of superheated steam.

3. A method of cleaning, sterilizing and disinfecting cars, said method comprising subjecting said matter and the adjacent parts of the car to the heat and force of a high pressure dynamic blast of steam of about 150 pounds pressure and about 358 degrees F.

4. A method of cleaning, sterilizing and disinfecting and protecting from destructive bacteria, wood lined containers, said method comprising subjecting the wooden parts to the latent heat and force of a high pressure dynamic blast of steam of about 150 pounds pressure and about 358 degrees F., thereby cleaning, highly heating, penetrating deeply into said wooden parts, sterilizing said parts and heating said parts to aid in subsequent drying.

5. A method of cleaning, sterilizing and disinfecting and protecting from destructive bacteria, wood lined containers, said method comprising subjecting the wooden parts to the latent heat and force of a high pressure dynamic blast of steam of about 150 pounds pressure and about 358 degrees F., thereby cleaning, highly heating, penetrating deeply into said wooden parts, sterilizing said parts and heating said parts to aid in subsequent drying; and then introducing disinfectants into said high pressure blast and applying the blast to said parts, thereby to cause the disinfectants to deeply penetrate the parts, to preserve them and to further heat the parts to aid in subsequent drying.

6. A method of cleaning, sterilizing and disinfecting and protecting from destructive bacteria, wood lined cars containing thick masses of frozen, putrefiable matter, said method comprising subjecting said matter and the adjacent wooden parts of the car to the latent heat and force of a high pressure dynamic blast of superheated steam, thereby simultaneously heating, detaching, softening, melting, sweeping and transporting said matter to the exterior of the car, cleaning, highly heating, penetrating deeply into said wooden parts, sterilizing said parts and heating said parts to aid in subsequent drying.

7. A method of cleaning, sterilizing and disinfecting and protecting from destructive bacteria, wood lined cars containing thick masses of frozen, putrefiable matter, said method comprising subjecting said matter and the adjacent wooden parts of the car to the latent heat and force of a high pressure dynamic blast of steam of about 150 pounds pressure and about 358 degrees F., thereby simultaneously melting, softening, and detaching said matter and warming said parts; and disposing said blast in the direction to sweep out the melt and detached frozen matter from the car, thereby further simultaneously heating, detaching, softening, melting, sweeping and transporting said matter to the exterior of the car, cleaning, highly heating, penetrating deeply into said wooden parts, sterilizing said parts and heating said parts to aid in subsequent drying.

8. A method of cleaning, sterilizing and disinfecting and protecting from destructive bacteria, wood lined cars containing thick masses of frozen, putrefiable matter, said method comprising subjecting said matter and the adjacent wooden parts of the car to the latent heat and force of a high pressure dynamic blast of steam of about 150 pounds pressure and about 358 degrees F., thereby simultaneously melting, softening, and detaching said matter and warming said parts; and disposing said blast in a direction to sweep out the melt and detached frozen matter from the car, thereby further simultaneously heating, detaching, softening, melting, sweeping and transporting said matter to the exterior of the car, cleaning, highly heating, penetrating deeply into said wooden parts, sterilizing said parts and heating said parts to aid in subsequent drying, then introducing disinfectants into said high pressure blast and applying the blast to said parts, thereby to cause the disinfectants to penetrate the parts, to preserve them and further heat the parts to aid in subsequent drying.

JOHN ELDON SHEPHERD.